J. F. HERMANN.
HAY TEDDER.
APPLICATION FILED NOV. 18, 1908.
940,968.
Patented Nov. 23, 1909.
2 SHEETS—SHEET 1.
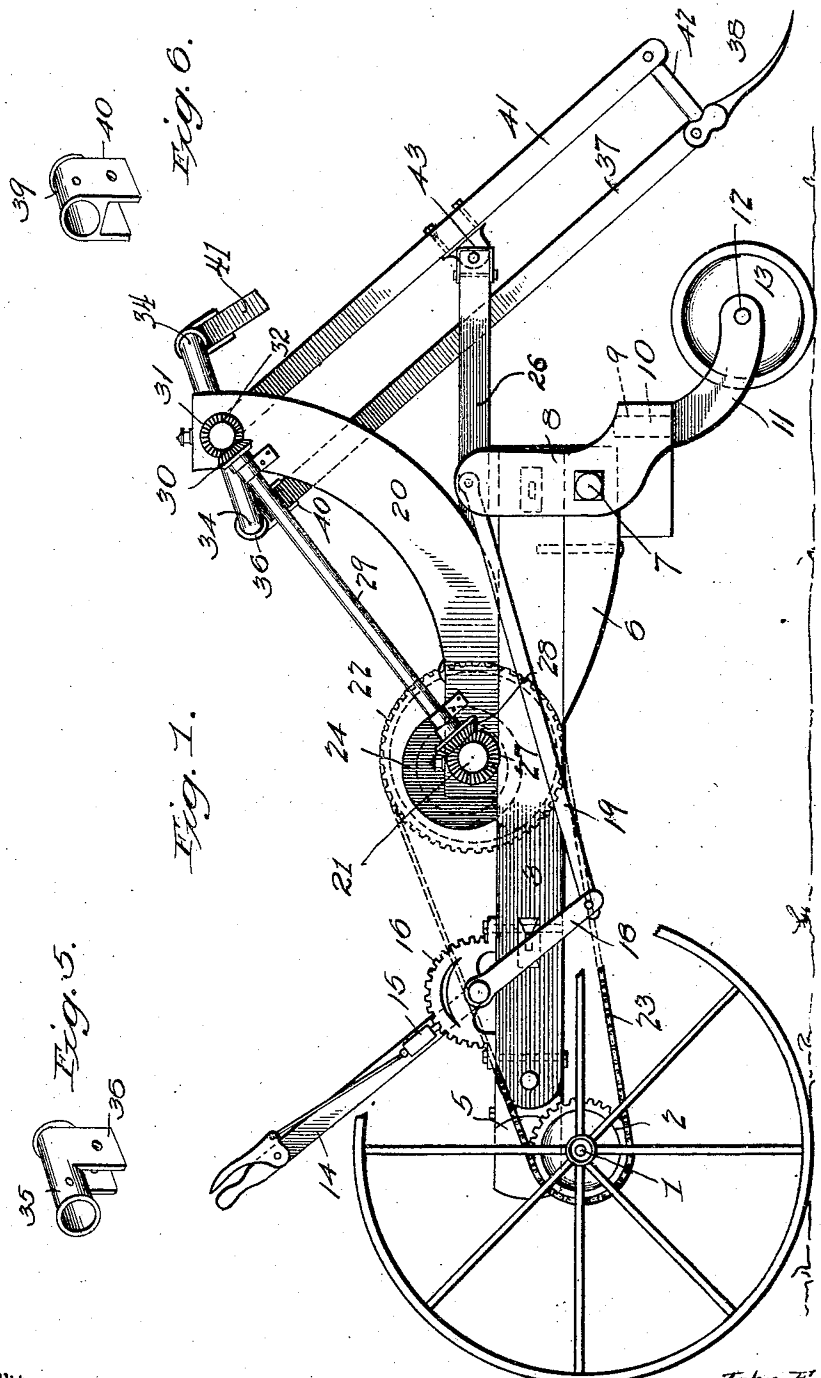
Witnesses
T. L. Hockdale
G. A. Cotter.
Inventor
John F. Hermann,
By E. E. Vrooman,
his Attorney.
ANDREW B. GRAHAM CO., PHOTO-LITHOGRAPHERS, WASHINGTON, D. C.

J. F. HERMANN.
HAY TEDDER.
APPLICATION FILED NOV. 18, 1908.
940,968.
Patented Nov. 23, 1909.
2 SHEETS—SHEET 2.
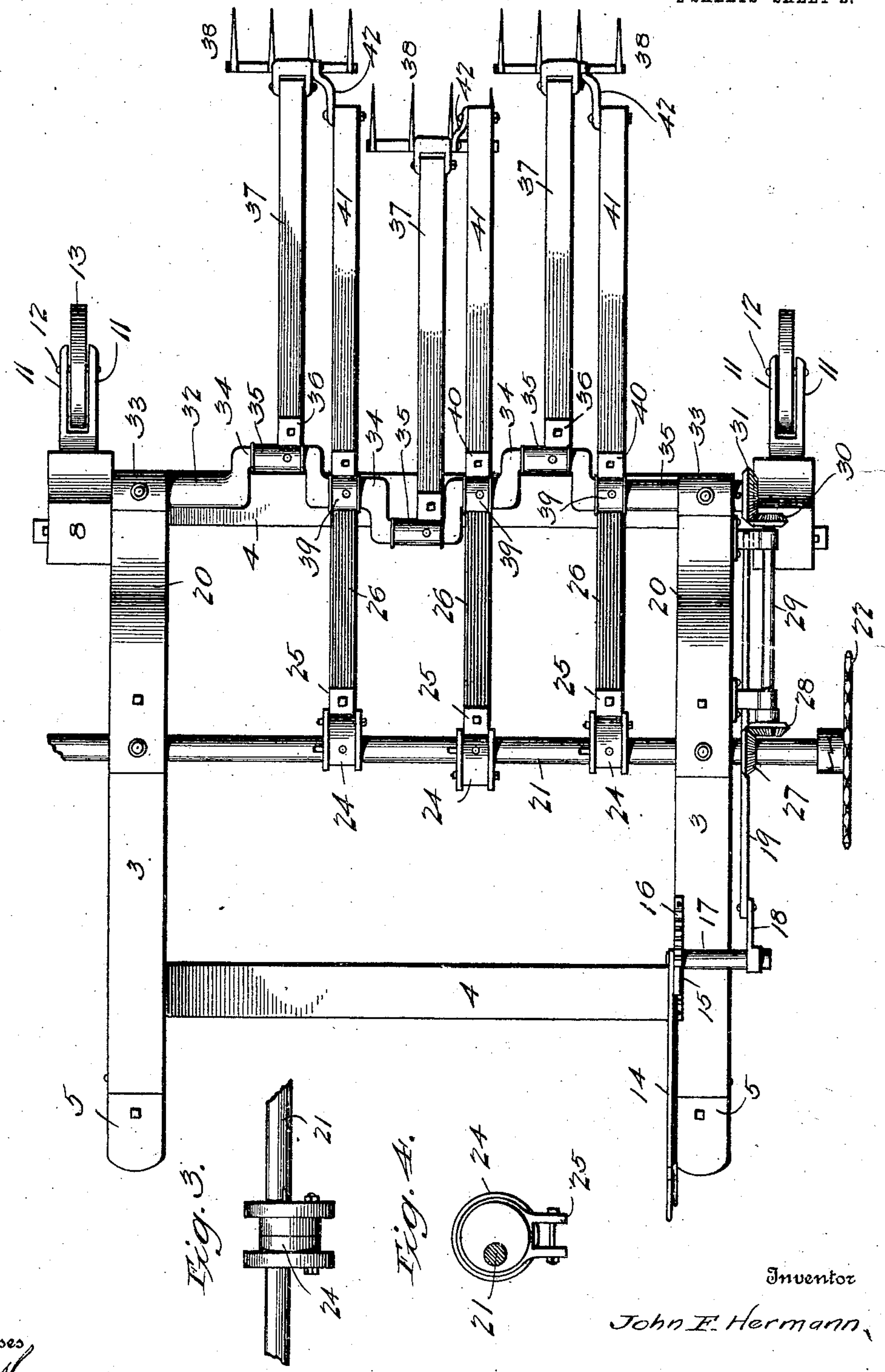
Witnesses
T. L. Mockabee
G. A. Cotter.
Inventor
John F. Hermann.
By E. E. Vrooman,
his Attorney
ANDREW. B. GRAHAM CO., PHOTO-LITHOGRAPHERS, WASHINGTON, D. C.

UNITED STATES PATENT OFFICE.

JOHN F. HERMANN, OF MOLINE, ILLINOIS.

HAY-TEDDER.

940,968. Specification of Letters Patent. Patented Nov. 23, 1909.

Application filed November 18, 1908. Serial No. 463,219.

*To all whom it may concern:*

Be it known that I, JOHN F. HERMANN, a citizen of the United States, residing at Moline, in the county of Rock Island and State of Illinois, have invented certain new and useful Improvements in Hay-Tedders, of which the following is a specification, reference being had therein to the accompanying drawing.

This invention comprises certain novel improvements in tedders whereby the same may be readily attached to, and receive power from, a mower, and in which certain novel coöperating lever mechanism is employed to operate the tedding forks.

In connection with the foregoing, the invention also contemplates the employment of novel mechanism for raising or lowering the tedder frame so as to place the tedding forks in an operative or inoperative position as desired.

In carrying out the objects of the invention generally stated above it will of course be understood that the essential features are susceptible of structural changes and modifications in details, but a preferred and practical embodiment of the same is shown in the accompanying drawings, wherein—

Figure 1 is a side elevation of the improved tedder, showing the same coupled to the rear axle of a mower. Fig. 2 is a top plan view. Figs. 3 and 4 are detail views of the eccentrics shown in Fig. 2. Fig. 5 is a detail view of the coupling for connecting the fork arms with their operating crank. Fig. 6 is a similar view of the coupling for connecting the fork operating arms with their cranks.

Like characters of reference designate corresponding parts.

Referring to the accompanying drawings, 1 designates a rear axle of a mower which has mounted thereon a sprocket wheel 2.

The improved tedder comprises primarily a frame composed of side beams 3 and connecting beams 4, the side beams 3 having end coupling members 5 for detachably connecting them with the axle 1 of the mower. The other ends of said beams 3 carry shaft hangers 6 which support a transversely extending shaft 7 upon each end of which a bracket 8 is held, said bracket at its lower end being provided with a longitudinally extending shaft recess 9 for the reception of a shaft, or pintle 10, the lower portion of which is enlarged and divided to form outwardly curved bifurcated members 11 forming ears for the reception of a shaft 12 carrying a wheel or roller 13. Adjacent to the coupling ends of the side beams 3, an upright lever 14 is mounted, said lever being provided with a hand operated pawl 15 which engages with a segment 16 mounted on said beam. The lower end of the lever 14 connects with a horizontally extending rod 17 mounted in bearing blocks on said beam 3, said rod 17 carrying a lever 18 which has a pivotal connection with one end of a rod 19 the other end of which is connected with the upper end of the bracket 8. As thus far described it will be readily understood that a movement of the lever 14 will rock the brackets 8 on their shaft 7, and thereby move the wheels or rollers 13 to a position beneath or beyond the frame of the tedder, which movement of the said rollers will raise or lower the end of said frame owing to the described mounting of said rollers.

Each of the side beams 3 has mounted on its rear end portion an upwardly curved standard 20 the lower or inner end of which has bearings formed through it for the reception of a shaft 21 carrying a sprocket wheel 22 which has a sprocket chain connection 23 with the sprocket wheel 2 mounted on the axle 1 of the mower. Said shaft 21 has eccentrics 24 mounted thereon which carry loose castings 25 which receive one end of arms 26 for imparting an outward and inward movement to the tedding forks, as will presently be explained. A pinion 27 is also mounted on said shaft 21 with which a similar pinion 28 is held in mesh, said pinion 28 being fast on one end of a shaft 29 the other end of which is also provided with a pinion 30 that is held in mesh with a pinion 31 fast on a crank shaft 32 which is mounted in bearings 33 formed in the upper end of the standard 20. Said crank shaft 32 is provided with a plurality of cranks 34, corresponding in number to the eccentrics mounted on the shaft 21, said cranks being so arranged that they alternately project in opposite directions, and each have a sleeve 35 loose thereon and provided with outstanding spaced apart flanges 36 forming a housing for the reception of one end of a fork rod or bar 37 the free end of which carries a fork 38. Adjoining each crank 34, the said crank shaft carries a loose sleeve 39 which is provided with spaced apart flanges 40 which receive and hold the upper ends of fork operating arms 41. The lower ends of said arms 41 have a pivotal connection with a bracket 42 carried by the forks 38.

The intermediate portion of each fork-operating arm 41 has fast thereon a bearing block 43 to which the outer end of each of the arms 26 carried by the shaft 21 is pivotally connected.

It will be understood from the foregoing that a turning of the mower axle 1 will impart a similar movement to the shaft 21, and through the described pinion and shaft connection with the crank shaft 32, a similar movement will be imparted to the latter. The turning of the shaft 21 causes its eccentrically mounted arms 26 to be reciprocated and, through the connection between said arms 26 and the fork operating arms 41, the latter will be rocked forwardly and rearwardly in alternation. The turning of the shaft 32 causes the arms 41 and 37 to alternately raise or lower, the raising or lowering of the arms 41 imparting a "kicking" movement of the lower end of the arms 37 to cause the forks to throw the material gathered, in a manner well understood.

From the foregoing it will be seen that the described system of coöperating rods or arms is one that assures of the desired movement of the fork arms in a positive and direct manner without any other power than that derived from a turning movement of the mower axle.

Another distinctive feature of the present invention is in the described manner of elevating or depressing the rear end of the tedder frame, which greatly facilitates the placing of the forks in a position where they will properly handle the material being gathered, or may be readily removed from such position.

Claims:—

1. A tedder comprising a frame, standards carried by one end of said frame, a crank shaft mounted in the upper ends of said standards, tedding forks swiveled to the cranks of said crank shaft, fork operating arms swiveled to said crank shaft and having a pivotal connection with said forks, and arms having a swiveled connection with said fork operating arms.

2. A tedder comprising a frame, standards carried by one end of said frame, a shaft journaled in the lower end of said standards, eccentrics mounted on said shaft, arms connected to said eccentrics, a crank shaft journaled in the upper ends of said standards, tedding arms mounted on the cranks of said crank shaft and carrying forks at their free ends, fork operating arms carried by said crank shaft and having their lower ends pivotally connected with said forks and their intermediate portions connected with the eccentrically mounted arms, and means for rotating both of said shafts to cause the eccentrically mounted arms to impart an outward and inward movement to the fork operating arms, and an upward and downward movement to said tedding arms and said fork operating arms in alternation.

3. A tedder comprising a frame, standards carried by one end of said frame, a shaft carried by the lower end of said standards, arms eccentrically connected with said shaft, a shaft carried by the upper end of said standard and provided with a plurality of cranks arranged in alternation, tedding arms loosely connected with said cranks, and provided with forks at their free ends, fork operating arms loosely connected with said shaft adjacent to each crank, a pivotal connection between said forks and said fork operating arms, and a pivotal connection between said eccentrically connected arms and said fork operating arms.

4. A tedder comprising a frame, standards carried by one end of said frame, a shaft journaled in the lower end of said standards, arms eccentrically connected with said shaft, a shaft journaled in the upper end of said standards and provided with a plurality of cranks corresponding in number with the arms carried by the first mentioned shaft, fork arms having a loose connection with said cranks, forks carried by said fork arms, fork operating arms loosely connected with said shaft adjacent to each crank, a pivotal connection between said fork operating arms and the forks, and a pivotal connection between said fork operating arms and the eccentrically mounted arms.

In testimony whereof I hereunto affix my signature in presence of two witnesses.

JOHN F. HERMANN.

Witnesses:

ADAM HERMANN,

FRED HERMANN.